UNITED STATES PATENT OFFICE.

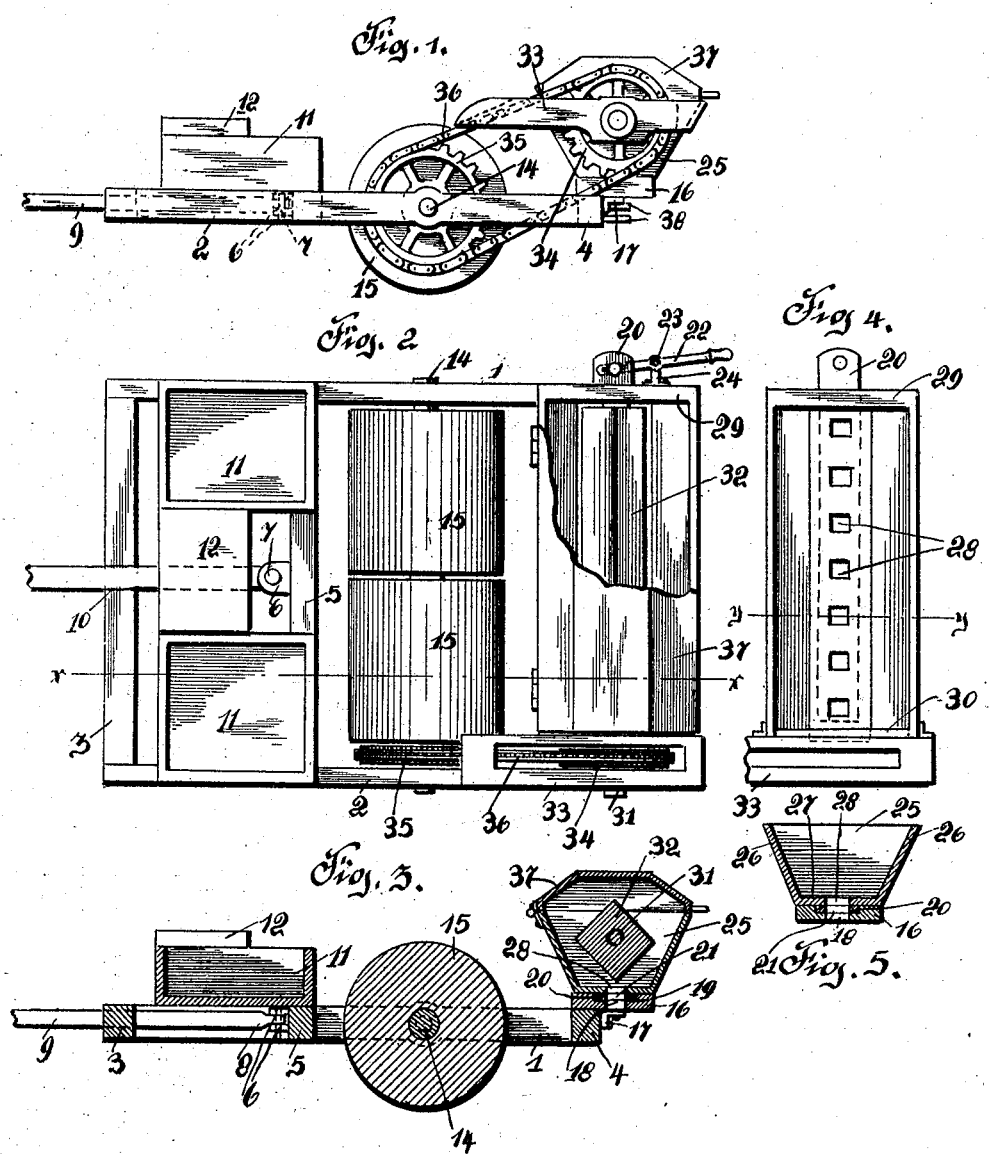

GEORGE SOBER, OF LEECHBURG, PENNSYLVANIA.

SEEDER AND FERTILIZER-DISTRIBUTER.

No. 806,507.  Specification of Letters Patent.  Patented Dec. 5, 1905.

Application filed October 10, 1905. Serial No. 282,124.

*To all whom it may concern:*

Be it known that I, GEORGE SOBER, a citizen of the United States of America, residing at Leechburg, in the county of Armstrong and State of Pennsylvania, have invented certain new and useful Improvements in Seeders and Fertilizer-Distributers, of which the following is a specification, reference being had therein to the accompanying drawings.

This invention relates to certain new and useful improvements in seeders and fertilizer-distributers.

My invention aims to combine that type of machine commonly known as a "seeder" or "spreader" and a roller, the roller being adapted to disintegrate or break the soil prior to distributing fertilizer, as lime, which is to be spread or distributed upon the soil. In this connection my improved implement is also adapted, when reversed, for sowing seed, such as timothy-seed. To this end I have devised a machine which will be extremely simple in construction, strong and durable, comparatively inexpensive to manufacture, and easily operated.

With the above and other objects in view, which will more readily appear as the nature of the invention is better understood, the same consists in the novel construction, combination, and arrangement of parts, to be hereinafter described and then specifically claimed.

Referring to the drawings accompanying this application, like numerals of reference designate corresponding parts throughout the several views, in which—

Figure 1 is a side elevation of my improved implement. Fig. 2 is a plan view of the same partially broken away. Fig. 3 is a longitudinal sectional view of the implement, taken on the line $x$ $x$ of Fig. 2. Fig. 4 is a plan view of the fertilizer-receptacle, and Fig. 5 is a cross-sectional view on the line $y$ $y$ of Fig. 4.

To put my invention into practice, I construct my improved implement of a rectangular frame consisting of side rails 1 and 2 and end rails 3 and 4. The frame is provided with a transversely-disposed beam 5, which centrally of its length is provided with lugs 6 6. Adapted to be secured between these lugs by a pin 7 is the end 8 of a tongue 9, said tongue resting in a notch 10 formed in the end rail 3. This tongue is employed for hitching a team of animals to the implement in order that it may be drawn across the soil to be treated. The transversely-disposed beam 5, together with the side rails 1 and 2, support boxes 11 11 and a seat 12, the boxes being employed as reservoirs for the fertilizers or seeds to be distributed or spread by my improved implement.

Journaled in the side rails 1 and 2 intermediate their ends is a transversely-disposed shaft 14, upon which are mounted two rollers 15 15, these rollers being adapted to disintegrate and crush clods or particles of soil over which they travel.

Upon the end rail 4 is mounted a rearwardly-extending plate 16, supported by angular brackets 17 17. The plate 16 is provided with a longitudinally-disposed slot 18, the sides of said slot being chamfered or shouldered, as at 19, to form a guideway in the upper face of the plate 16. In this guideway is mounted a slide 20, having a plurality of longitudinally-arranged openings 21 formed therein. The outer end of the slide is connected to a lever 22, that is fulcrumed, as at 23, upon a bracket 24, carried by the end of the plate 16, the lever 22 extending rearwardly to be manipulated by the operator of the implement.

Upon the plate 16 is mounted a receptacle 25, having slanting sides 26. The bottom 27 of the receptacle is provided with a plurality of longitudinally-arranged openings 28, which are adapted to vertically aline at predetermined times with the openings 21 of the slide 20. Journaled in the ends 29 and 30 of the receptacle is a shaft 31, and upon the shaft within the receptacle is mounted a rectangular block 32, which serves to agitate the contents of the receptacle during the operation of the implement. The one end of the shaft 31 extends a short distance beyond the receptacle and through a housing 33, carried by the end 30 of the receptacle. Mounted upon the shaft 31 within the housing 33 is a sprocket-wheel 34, and mounted upon the shaft 31 is a sprocket-wheel 35. Over these sprocket-wheels travels a chain 36, which is adapted to impart a rotary motion to the shaft 31 from the shaft 14. The one side of the receptacle 25 is provided with a hinged lid 37, this lid being employed to close the receptacle and prevent the contents thereof from being jarred from the receptacle when the implement passes over extremely rough ground.

The end rail 4 is provided with two rearwardly-extending lugs 38 38, and when the implement is to be reversely operated, as will be presently described, the tongue 9 is carried to the rear end of the implement and connected to the lugs 38 38 in order that the implement may be reversely operated, in order that when the tongue is at one end the ground will be rolled prior to distributing fertilizing material and when the tongue is at the other end seed will be sown and the ground subsequently rolled over by the roller.

Operation: The implement is particularly adapted for spreading fertilizer over a soil, and I will assume that lime has been placed within the receptacle 25 and that the implement is being moved forward. As the implement is generally used after the soil has been plowed and possibly harrowed, the rollers 15 of the implement are adapted to further disintegrate the soil and place it in a condition to receive the fertilizer. As the operator of the implement generally walks behind the same during its operation, the lever 22 is adapted to be manipulated to reciprocate the slide 20 in order that the contents of the receptacle 25 may pass through the openings 28 and the openings 21 of the slide and be precipitated upon the soil over which the implement is passing. By manually operating the slide it is possible to spread larger quantities of the fertilizer upon some parts of the soil than upon the rest of the soil, this being determined by the experienced eye of the operator, who is able to determine by the color of the soil approximately the condition of the same. When lime is used as a fertilizer within the receptacle 25, the block 32 is adapted to agitate the same, breaking small particles and preventing the lime from clogging within the receptacle, the inclined sides thereof tending to force the lime toward the bottom of the receptacle and the openings 28. My improved implement can also be readily used for sowing various kinds of seed—for instance, timothy-seed—and in this instance a slide 20, having smaller openings formed therein, can be readily employed and the implement operated in a reverse direction by placing the tongue upon the rear end of the implement. When so operated, the rollers serve to press the timothy-seed into the soil in order that the seeds may take root, and the operator in this instance will walk at one side of the machine in order that the lever 22 can be properly manipulated.

I have provided the housing 33 to prevent the operator and other persons from contacting with the sprocket chain and wheel of the shaft 31, thus freeing the operator from all danger of being injured while the receptacle 25 is being filled with fertilizer or seed.

It is thought from the foregoing that the construction, operation, and advantages of the herein-described implement will be apparent without further description, and various changes in the form, proportion, and minor details of construction may be resorted to without departing from the spirit of the invention or sacrificing any of the advantages thereof.

What I claim, and desire to secure by Letters Patent, is—

1. In an implement, the combination with a rectangular frame having rollers journaled therein, of a receptacle carried by the end of said frame and having a plurality of openings formed in its bottom, a slide mounted in said receptacle and having openings formed therein adapted to register at predetermined times with the first-named openings, an agitator revolubly mounted in said receptacle, means actuated by the movement of said implement to rotate said agitator, means for applying traction alternatively to the opposite ends of the frame and means to reciprocate said slide, substantially as described.

2. In an implement, the combination with a frame, of rollers journaled in said frame, a receptacle carried by one end of said frame and having openings formed in its bottom, a slide mounted in said receptacle and adapted to control the openings of said receptacle, means to reciprocate said slide, means actuated by the movement of said implement to agitate the contents of said receptacle and means for applying traction devices alternatively to opposite ends of the frame, substantially as described.

3. An implement of the type described embodying a frame having rollers journaled therein, a receptacle carried at one end of said frame and having openings formed in its bottom, means to open and close said openings, means actuated by the movement of said implement to agitate the contents of said receptacle, a removable tongue, and means carried by the frame whereby said tongue may be alternatively attached to either end thereof, substantially as described.

In testimony whereof I affix my signature in the presence of two witnesses.

GEORGE SOBER.

Witnesses:
J. C. McGeary,
J. C. Sober.